Figure 1:
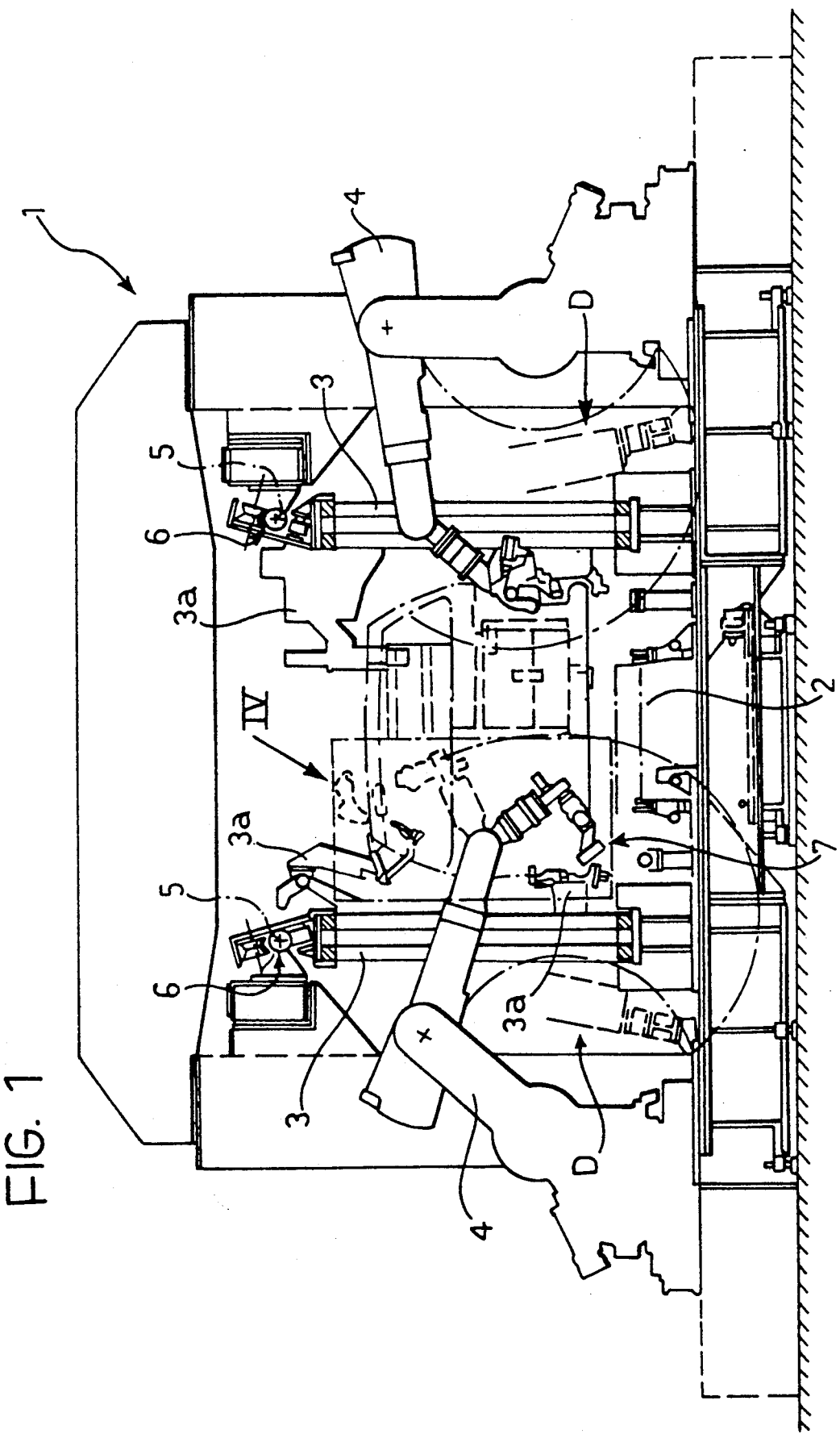

United States Patent [19]

Alborante

[11] Patent Number: 5,258,598
[45] Date of Patent: Nov. 2, 1993

[54] STATION FOR ASSEMBLING PRESSED SHEET-METAL STRUCTURES WITH WELDING ROBOTS ALSO USABLE PERIODICALLY FOR CHECKING THE FIXTURES USED IN THE STATION

[75] Inventor: Giancarlo Alborante, Trofarello, Italy

[73] Assignee: Comau S.p.A., Turin, Italy

[21] Appl. No.: 714,451

[22] Filed: Jun. 13, 1991

[30] Foreign Application Priority Data

Jun. 15, 1990 [IT] Italy .................. 67440 A/90

[51] Int. Cl.$^5$ ............................................ B23K 11/25
[52] U.S. Cl. ................................................ 219/86.41
[58] Field of Search ............... 219/86.41, 109, 110, 219/124.34

[56] References Cited

U.S. PATENT DOCUMENTS 4,447,697  5/1984  Dunne et al. ............... 219/86.41
4,492,847  1/1985  Masaki et al. .............. 219/124.34

FOREIGN PATENT DOCUMENTS 0147530  10/1985  Fed. Rep. of Germany .
2465553   3/1981   France .
62-45483  2/1987   Japan ........................ 219/86.41
8602307   4/1986   World Int. Prop. O. .

OTHER PUBLICATIONS

Laser Working Device, vol. 9, No. 213, Aug. 30, 1985, Japan.
European Search Report; EP 91 83 0253; Oct. 4, 1991; Examiner Aran D. D.

*Primary Examiner*—Clifford C. Shaw
*Attorney, Agent, or Firm*—Fish & Richardson

[57] ABSTRACT

A station for assembling pressed sheet-metal structures, for example, motor-vehicle bodies, includes fixtures for locating and clamping the various components of the structure in the assembled condition and programmable robots with electrical spot-welding heads. One or more robots have means for replacing their welding heads with sensors for checking the positioning and/or configuration of the locating and clamping fixtures to ensure the quality of the product output from the station.

21 Claims, 3 Drawing Sheets

STATION FOR ASSEMBLING PRESSED SHEET-METAL STRUCTURES WITH WELDING ROBOTS ALSO USABLE PERIODICALLY FOR CHECKING THE FIXTURES USED IN THE STATION

The present invention relates to a station for assembling pressed sheet-metal structures, for example, motor-vehicle bodies, including fixtures for locating and clamping the various components of the structure in the assembled condition and programmable robots with electrical spot-welding heads.

Assembly stations of the type indicated above have been produced and sold by the Applicant for some time. The locating and clamping fixtures with which the assembly stations are provided — whose positions are adjustable — define the correct positions of the components of the structure during welding. The displacement of one or more fixtures from their correct positions results in the production of defective products. For example, in the case of a motor-vehicle body, the displacement of one or more locating fixtures from their correct positions may result in a body being output from the station with parts which are deformed from their intended configurations.

Currently, when a situation of the type described above occurs, the production line has to be stopped and one or more operators must intervene to check the correct positioning of all the fixtures of the welding station until they identify the wrongly-positioned fixture or fixtures and take action to eliminate the error. This operation is lengthy and is also laborious because it may be difficult for the operator to gain access to the various fixtures.

In order to prevent the aforesaid problems, the subject of the present invention is an assembly station of the type indicated above, characterised in that at least one of the programmable robots in the assembly station has means for replacing its welding head with a sensor for checking the positioning and/or configuration of the fixtures.

In a preferred embodiment, the sensor is constituted by an orientable television camera connected to means for processing its output signals.

Thus, the assembly station according to the invention can itself carry out automatically the periodic checks and controls which ensure the quality of the product by means of its robots.

Figure 2:
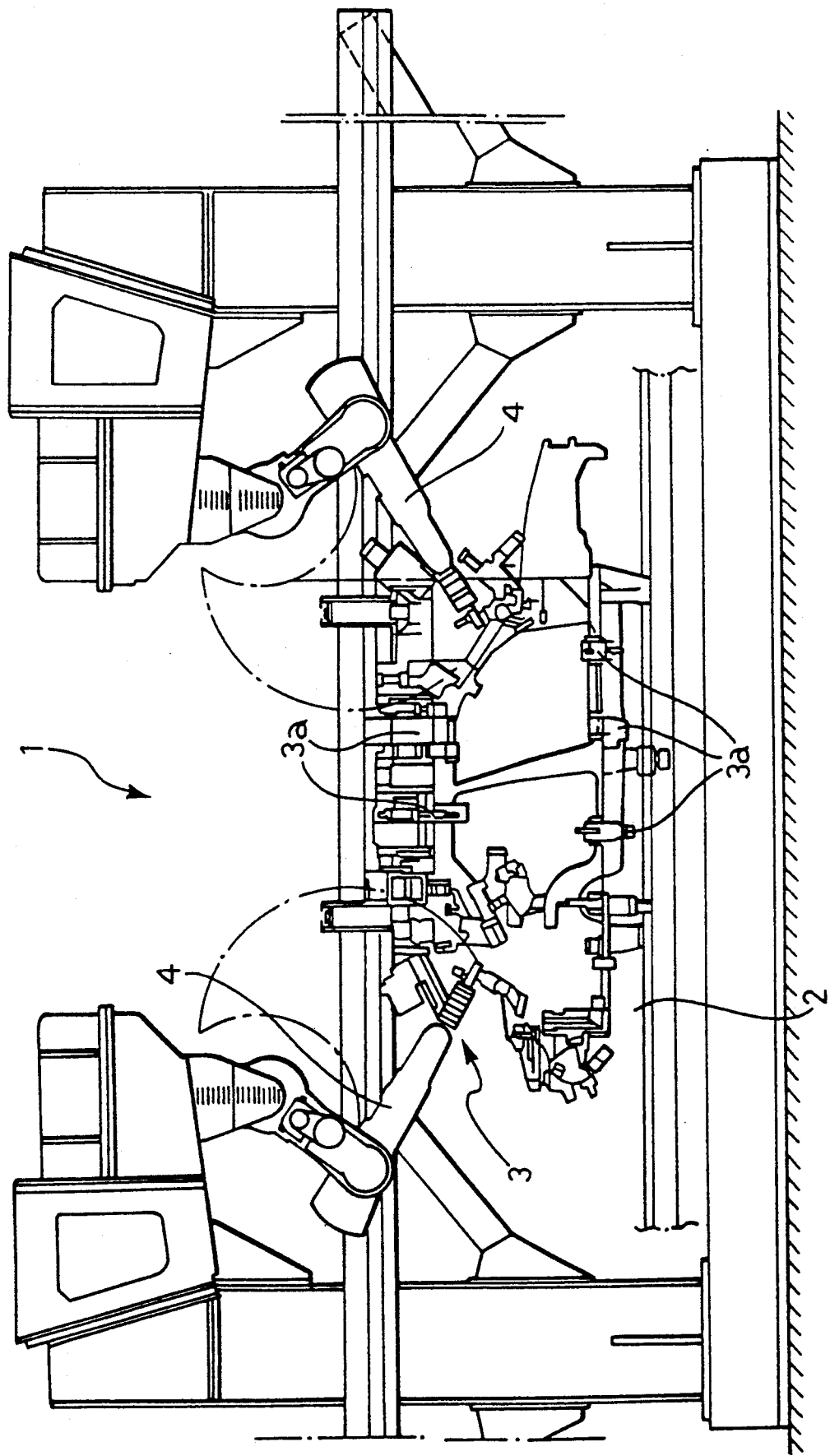
Figure 4:
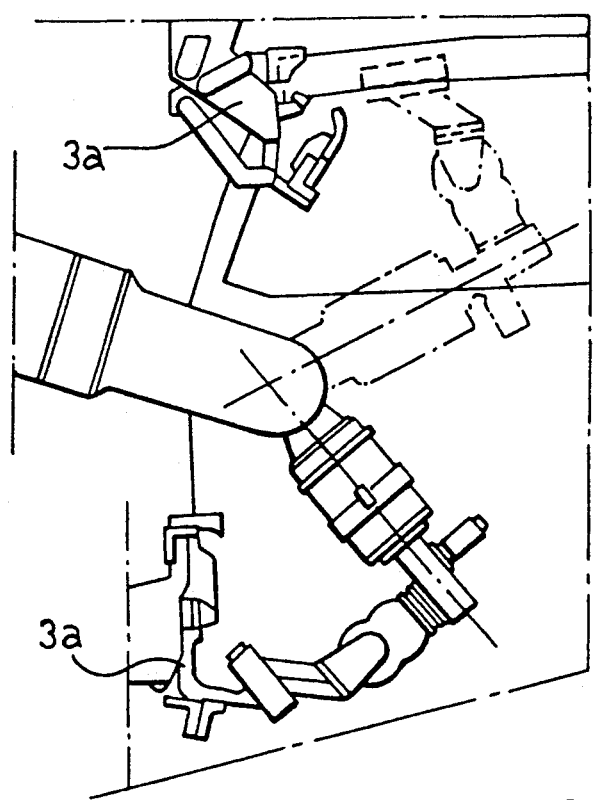
Figure 3:
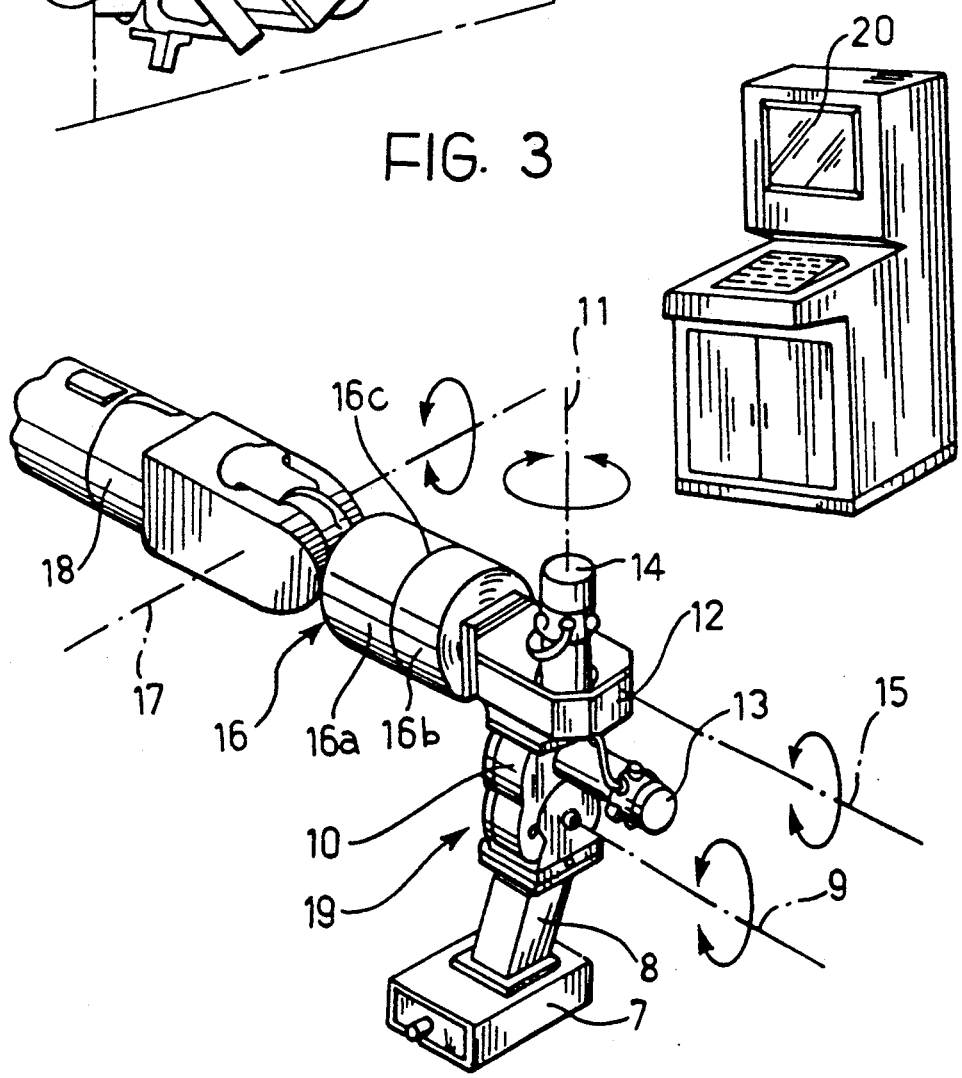

Further characteristics and advantages of the invention will become clear from the description which follows with reference to the appended drawings provided purely by way of non-limiting example, in which:

FIG. 1 is a cross-section of a station according to the invention for welding motor-vehicle bodies, FIG. 2 is a side view of the station of FIG. 1, FIG. 3 is a perspective view of a detail of the station of the invention on an enlarged scale, and FIG. 4 shows a further detail of the station according the invention.

With reference to FIGS. 1 and 2, a station formed according to the invention for welding motor-vehicle bodies is indicated 1.

For example, the station may be of the type described and illustrated in the present Applicant's German patent No. 2 810 822.

The structural details of the station do not fall within the scope of the present invention and may be in accordance with the prior art. For this reason, they will be described only briefly below.

A conveyor line 2 passes through the station 1 and transports a plurality of bodies to be welded through the station in succession. The bodies arrive in the station in a preassembled condition in which their components have been connected loosely, for example, by the bending of sheet-metal tabs which interconnect the components. For this reason, the body components have to be clamped in their exact positions of assembly during welding. For this purpose, two frames 3 are provided on the two sides of the line 2 in the welding station 1 and carry a plurality of clamping fixtures 3a (some of which are visible in the drawings) including locating elements and clamps which engage the various components of the body when it is in the working position in the welding station 1 in order to keep them in the correct positions of assembly during welding. The welding is carried out by a plurality of programmable robots 4 with welding heads (not shown) which perform a series of spot-welds which suffice to fix the geometry of the body. Once the welding has been carried out, the locating and clamping fixtures are released from the body and the body is discharged from the station, enabling a subsequent body to enter the station for welding. The two frames 3 which carry the locating and clamping fixtures 3a are pivotable about respective upper longitudinal axes 5 between substantially vertical positions (shown in continuous outline in FIG. 1) in which the fixtures 3a can engage the body, and positions (shown in broken outline and indicated by the arrows D) in which they are opened out and the fixtures 3a are spaced from the body so that the welded body can leave the station and a new body can enter the station for welding. Still according to the prior art cited above, the two frames 3 are also slidable along upper longitudinal guides 6 so that they can be exchanged rapidly with a second pair of frames 3 (not visible in the drawings) adapted for working on a different type of body. The same welding station can thus work on various body types. As already indicated above, all the characteristics described above are known from the Applicant's prior patent mentioned above. Further details concerning the construction and advantages of this arrangement can therefore be obtained directly from that patent.

The main characteristic of the station of the present invention consists of the fact that at least some of the welding robots have means for enabling their normal electrical spot-welding heads to be replaced by sensors which, in the embodiment illustrated, are constitued by orientable television cameras 7. With reference in particular to FIG. 3, each orientable television camera 7 is carried by an arm 8 which is rotatable about an axis 9 relative to an auxiliary support structure 10 which is in turn rotatable relative to a further structure 12 about an axis 11 perpendicular to the axis 10. The electric motors for rotating the arm 8 and the auxiliary structure 10 are indicated 13, 14 respectively. The structure 12 in turn is mounted for rotation about an axis 15 parallel to the axis 9 on a support device 16 articulated to the wrist 18 of the robot about an axis 17. The structure 16 has a part 16a which is connected permanently to the robot's wrist and a part 16b which is connected releasably to the part 16a. The structural details of the means used for this connection are of known type and do not fall within the scope of the present invention. For this reason, these details have been omitted from the appended drawings which also makes the latter simpler and easier to understand. In practice, the structure 16 can be produced according to the prior art relating to robots with devices for exchanging their tools. According to this prior art, a robot can replace its own tool.

In the case of the present invention, the robot 4 can disengage the welding head at the surface 16c where it is connected to the part 16a and then equip itself with the entire adjustable structure, indicated 19 in the drawing, which carries the television camera 7. The television camera is connected to means for processing its output signals including, for example, a display terminal 20.

Periodically, one or more robots replace their welding heads with orientable television cameras 7 and bring the television cameras into correspondence with the fixtures 3a (see FIG. 4 which is a magnified view of the detail IV of FIG. 1) so that the configuration and/or positioning of the fixtures can be checked. Thus, if it detects that the fixtures are displaced from their correct positions, action can be taken immediately to correct the displacement. The checking operation does not involve any wastage of time by skilled personnel or difficulties resulting from difficult access to the fixtures for the personnel.

At the same time, the checks are carried out with the use of the same robots which are provided at the station for welding the body.

Naturally, the principle of the invention remaining the same, the details of construction and forms of embodiment may be varied widely with respect to those described and illustrated purely by way of example, without thereby departing from the scope of the present invention.

I claim:

1. A station for assembling pressed sheet-metal structures, comprising:
    a plurality of fixtures for locating and clamping the various components of the structures into a conformation corresponding to their assembled condition;
    at least one programmable robot arm with electrical spot-welding head; and
    a sensor head;
    characterized in that at least one said programmable robot arm has means for replacing its welding head with a said sensor head, said programmable robot arm being configured to bring said sensor head into correspondence with two or more of said fixtures for checking the positioning and/or configuration of the fixtures.

2. An assembly station according to claim 1, characterized in that the sensor head comprises an orientable television camera connected to means for processing its output signals.

3. An assembly station according to claim 2, characterized in that the television camera is carried by a first member mounted for rotation about a first axis on a second member which is in turn mounted on a third member for rotation about a second axis perpendicular to the first axis, the third member being mounted for rotation about a third axis perpendicular to the second axis relative to a fourth member releasably connected to a wrist of the robot arm.

4. A station for assembling pressed sheet-metal structures, comprising
    a plurality of fixtures for locating and clamping the various components of the structures in assembled condition;
    a programmable robot arm with an electrical spot-welding head, the robot arms having means for replacing its welding head with an orientable television camera for checking the positioning and/or configuration of the fixtures; and
    means for processing the output signals of the television camera;
    characterized in that the television camera is carried by a first member mounted for rotation about a first axis on a second member which is in turn mounted on a third member for rotation about a second axis, the third member being mounted for rotation about a third axis relative to a fourth member releasably connected to the wrist of the robot arm.

5. An assembly station according to claim 4 wherein the rotation about the first axis is articulatory rotation.

6. An assembly station according to claim 4 wherein the rotation about the second axis is axial rotation.

7. An assembly station according to claim 4 wherein the rotation about the third axis is articular rotation.

8. An assembly station according to claim 4 wherein the second axis is perpendicular to the first axis.

9. An assembly station according to claim 4 wherein the third axis is perpendicular to the second axis.

10. An assembly station according to claim 4 wherein the rotation about the first axis is articulatory rotation, the rotation about the second axis is axial rotation, the rotation about the third axis is articular rotation, the second axis is perpendicular to the first axis, and the third axis is perpendicular to the second axis.

11. An assembly station according to claim 4 wherein the robot arm further comprises a fourth axis for rotation above the wrist.

12. An assembly station according to claim 11 wherein the rotation about the fourth axis is articular rotation.

13. An assembly station according to claim 11 wherein the rotation about the first axis is articulatory rotation, the rotation about the second axis is axial rotation, the rotation about the third axis is articular rotation, the rotation about the fourth axis is articular rotation, the second axis is perpendicular to the first axis, the third axis is perpendicular to the second axis, and the fourth axis is perpendicular to the third axis.

14. A station for assembling pressed sheet-metal structures, comprising
    a plurality of fixtures for locating and clamping the various components of the structures into a conformation corresponding to their assembled condition;
    a single programmable robot arm with electrical spot-welding heads;
    an orientable television camera head;
    characterized in that the single programmable robot arm has means for replacing its welding head with the camera head, the robot arm configured to bring the camera head into correspondence with each of the fixtures for checking the positioning and/or configuration of the fixtures.

15. An assembly station according to claim 14 wherein the camera head is brought into correspondence with the fixtures by selected rotations of joints in the robot arm, the television camera being carried by a first member mounted for rotation about a first axis on a second member which is in turn mounted on a third member for rotation about a second axis, the third member being mounted for rotation about a third axis relative to a fourth member releasably connected to the wrist of the robot arm.

16. An assembly station according to claim 15 wherein the rotation about the first axis is articulatory rotation, the rotation about the second axis is axial rotation, the rotation about the third axis is articular rotation, the second axis is perpendicular to the first axis, and the third axis is perpendicular to the second axis.

17. An assembly station according to claim 15 wherein the robot arm further comprises a fourth axis for rotation above the wrist.

18. An assembly station according to claim 17 wherein the rotation about the first axis is articulatory rotation, the rotation about the second axis is axial rotation, the rotation about the third axis is articular rotation, the rotation about the fourth axis is articular rotation, the second axis is perpendicular to the first axis, the third axis is perpendicular to the second axis, and the fourth axis is perpendicular to the third axis.

19. A station for assembling pressed sheet-metal structures, comprising:
   a plurality of fixtures for locating and clamping the various components of the structures into a conformation corresponding to their assembled condition, the conformation being substantially three-dimensional and at least partially enclosing a volume;
   at least one programmable robot arm with electrical spot-welding head; and
   a sensor head;
   characterized in that at least one said programmable robot arm has means for replacing its welding head with a said sensor head, said programmable robot arm being configured to bring said sensor head into correspondence with two or more of said fixtures for checking the positioning and/or configuration of the fixtures.

20. A station for assembling pressed sheet-metal structures, comprising
   a plurality of fixtures for locating and clamping the various components of the structures into a conformation corresponding to their assembled condition, the conformation being substantially three-dimensional and at least partially enclosing a volume;
   a single programmable robot arm with electrical spot-welding heads;
   an orientable television camera head;
   characterized in that the single programmable robot arm has means for replacing its welding head with the camera head, the robot arm configured to bring the camera head into correspondence with each of the fixtures for checking the positioning and/or configuration of the fixtures.

21. A method of assembling a pressed sheet-metal structure, comprising the steps of:
   locating various components of the structure into a conformation corresponding to an assembled condition and clamping the various components with a plurality of clamping fixtures;
   inserting a sensor head into a programmable robot arm;
   manipulating the programmable robot arm to bring the sensor head into correspondence with two or more of the fixtures for checking the positioning and configuration of the fixtures;
   removing the sensor head from the robot arm and replacing the sensor head with a welding head;
   manipulating the robot arm to guide the welding head to weld the components into the structure.

* * * * *